Sept. 3, 1929.   F. W. MARTIN ET AL   1,727,126
FLEXIBLE CONNECTION
Filed Feb. 18, 1922

WITNESS.
Gustav Genzlinger.

INVENTORS
Frederick W. Martin
Montague H. Roberts
BY Synnestvedt & Lechner
ATTORNEYS Patented Sept. 3, 1929.

1,727,126

UNITED STATES PATENT OFFICE.

FREDERICK W. MARTIN, OF BROOKLYN, NEW YORK, AND MONTAGUE H. ROBERTS, OF ENGLEWOOD, NEW JERSEY, ASSIGNORS TO FRANKLIN RAILWAY SUPPLY COMPANY, A CORPORATION OF DELAWARE.

FLEXIBLE CONNECTION.

Application filed February 18, 1922. Serial No. 537,391.

Our invention relates to flexible pipe joints or connections, and is especially advantageous in joints for flexible connections such as the well-known McLaughlin "all metal" type, much used for the steam and air lines between locomotive and tender. We aim to improve the packing of such joints in respect of fluid tightness and wearing qualities, and to facilitate, expedite and cheapen the operation of repacking them as from time to time required. How these and other advantages may be secured through the invention will appear from our description hereinafter of the best practical embodiment known to us.

In the drawings, Fig. 1 is a fragmentary side elevation showing the flexible McLaughlin connections between a steam locomotive and its tender, for which our invention is especially advantageous.

Figure 1:
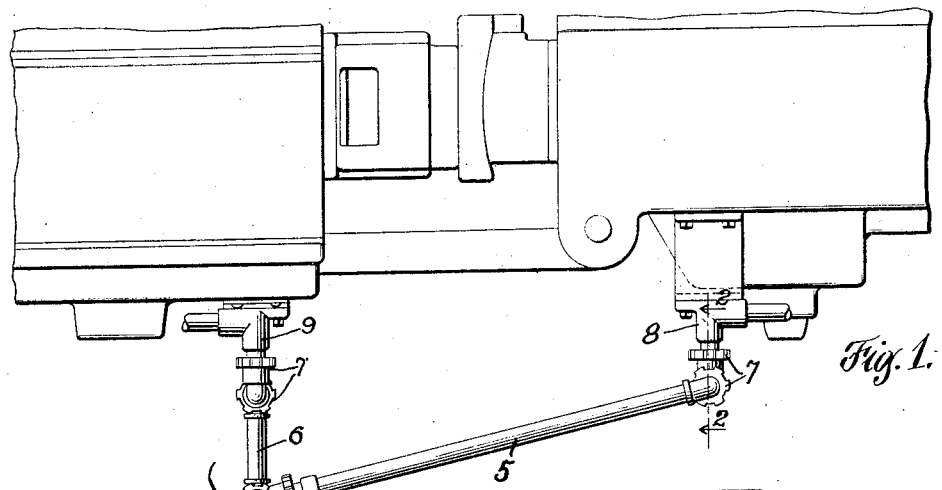
Figure 3:
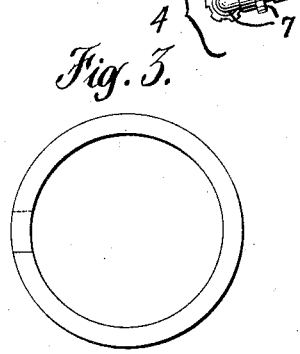
Fig. 3 is a "plan" or lateral view of a packing gasket shown in Fig. 2.

For present purposes, the McLaughlin connection 4 shown in Fig. 1 may be briefly described as comprising a couple of lengths of metal pipe 5 and 6 connected together by a pair of swivel joints 7, 7, and connected by similar pairs of swivel joints (or double swivel joints) 7, 7 to fittings 8 and 9 on the locomotive 10 and on the tender 11, respectively. The various swivel joints 7 are so arranged that the connection yields freely, by bending at one or more of the joints, to every possible relative motion of locomotive and tender in service. In and by themselves, the various swivel joints 7 may preferably be exact counter parts of one another.

Figure 2:
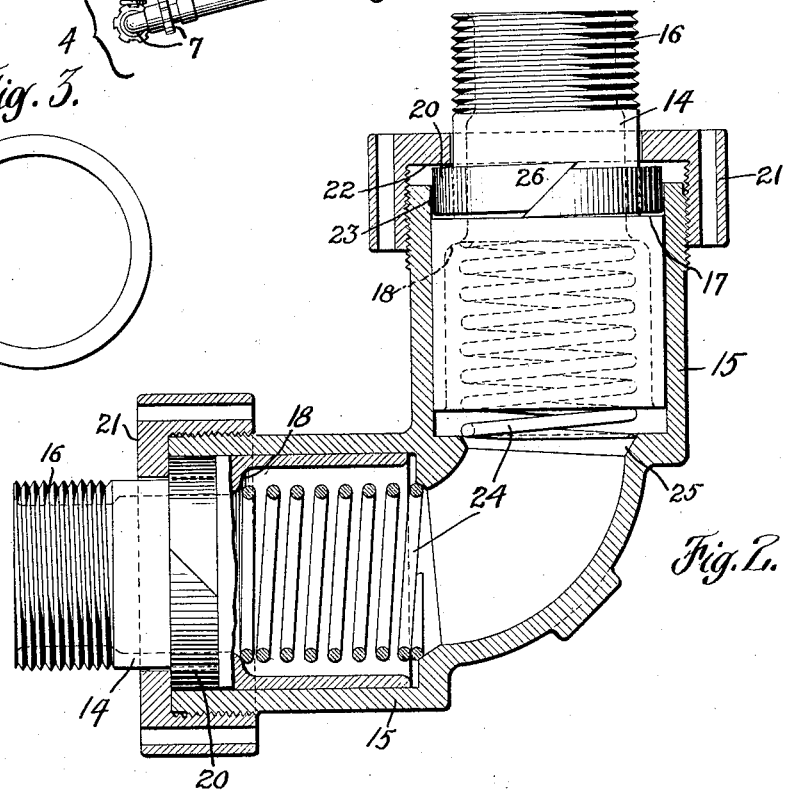
Fig. 2 shows a mid section through two of the swivel joints appearing in Fig. 1, taken as indicated by the line 2—2 in that figure, but on a larger scale, and illustrates the application of our invention to these joints.

Referring now to Fig. 2, it will be seen that each of the elements of the double swivel joint 7, 7 shown comprises relatively rotatable hollow members 14 and 15, each adapted for attachment to some other appropriate part of the connection 4. For this purpose, each member 14 is externally screw-threaded at 16, while the members 15, 15 together form one integral "body" in the nature of a 90° elbow. In the present instance, the member 14 is a short cylindrical sleeve, with an external enlargement here shown as a substantially flat, square shoulder 17, and also an internal shoulder 18, and telescopes in the internal cylindrical bore of the member 15. In normal relations of the parts, the shoulder 17 of the sleeve 14 lies in the bore of the body member 15. The extent of overlap and the closeness of fit afford bearing sufficient to maintain the alignment of the parts without binding or interference with their relative movement in an axial direction.

In the bore of the external body member 15, around the smaller portion of the internal sleeve member 14, is an annular packing 20 in the form of a ring gasket. This gasket 20 may be of any suitable material, such as rubber for example. On the externally threaded end of the body member 15 is screwed a nut 21 whose flange affords the member 15 an internal reduction in size in the shape of the shoulder 22 facing the external shoulder 17 of the sleeve 14.

In order, primarily, to maintain the parts in proper position when no pressure is in the line, a helical compression spring 24 is interposed between the internal shoulder 18 of the sleeve 14 as a movable abutment and a conical seat or socket 25 at the inner end of the bore of the body member 15 as a fixed abutment. This spring 24 constantly urges the sleeve outward in the body member 15 and maintains the packing 20 under some lateral compression between the shoulders 17 and 22.

As thus far described, the connection 4 and the joint 7 are like those already in use. The object of describing them at all, therefore, is to make perfectly clear the action and advantages of the novel features which we shall now proceed to describe, when applied to this type of flexible connection, and joint. It is to be understood, however, that our invention can also be adapted and applied to other types of flexible joints, and that the form and construction embodying the invention itself can also be varied and modified.

We have hitherto spoken of the packing 20 as if it were an annulus of absolutely unbroken continuity. In constructions hitherto used, such has been the case, and in order to permit of assembly, the gaskets had to fit loosely over the sleeve 14 and loosely within the elbow. As a result, only two "packing"

surfaces—the relatively smaller lateral ones were presented and one of these would always also be a "working" surface. This produced a tendency to leak. In addition, it was found that the packing gasket usually turned with the sleeve 14, which had the effect of loosening the nuts 21 and increasing the leakage.

An additional objection incident to the old arrangement was that the necessary frequent replacement of gaskets required not only the taking off of the nuts 21, but also the unscrewing of the sleeve 14 frequently by the application of a wrench to working surfaces thereof which, in consequence, became battered. The operation of repacking thus not only required considerable time but also resulted in serious damage. We overcome the difficulties described in the following manner: We preferably make the packing 20 expansible, and construct it in the form of a split ring with bevelled overlapping ends 26, 26. The ring 20 is originally made somewhat larger externally than the bore 23,—say $\frac{1}{16}$" larger in circumference,—so that when it is inserted in the bore its ends 26, 26 shall extend past or overlap one another a corresponding amount, as shown in the upper portion of Fig. 2. With this construction, the inclined plane or wedge-like interaction of the ends 26, 26 under lateral pressure or force exerted in an axial direction on the gasket 20 between the shoulders 17 and 22 will expand or spread the gasket and increase its diameter externally,—and thus force the gasket outward against the bore 23 while leaving its interior substantially out of contact with sleeve 14. It is thus in frictional "packing" on three surfaces, with the member 15, with the nut 21, and with the shoulder of the sleeve 14. In service, therefore, the packing 20 stays fast with the member 15, wear is confined to one lateral face of the packing, the nut 21 is not loosened, and leakage is prevented.

In order to attain the foregoing conditions with the advantages incident thereto it is necessary, of course, that the packing 20 be made sufficiently hard to insure its expansion outwardly under the axial compression described without permitting at the same time the objectionable inward "flowing" of the packing material which has been relied upon in former arrangements to produce a tight joint by frictionally gripping the internal member. As already suggested certain rubber compositions are sufficiently hard to very satisfactorily meet the requirements although other substances can be used if desired.

Furthermore, no leakage occurs at the lap or joint in the gasket in service, when, of course, the pressure in the line tends to force the sleeves and elbows apart. The pressure per square inch on the two lateral surfaces is the same and is approximately equal to the pressure per square inch in the line. Since the packing is "backed" by the elbow, in the bore of which it has been tightly pressed, it cannot open, and the pressure of the line, plus that of the spring, together with whatever reaction may be present from the forcing of the gasket against the bore of the elbow, are effective to prevent leakage at the joint. We have found by experience that the joints do not leak even after long continued service, and that they wear longer.

In assembling or renewing of gaskets, the ends are spread apart and passed around the sleeve, and thus it is only necessary to back off the nuts 21 without unscrewing the sleeves.

While we have illustrated our invention in connection with a swivel type of joint, it is to be understood that it is not limited to such a construction.

We claim:

1. A flexible joint including relatively movable members, one hollow with reduction in internal size, and the other with external enlargement within the first; and a split, bevel-ended gasket with overlapping ends around said reduced portion expansible in said first member to increase both its external and internal diameter under force exerted in an axial direction between the portion of reduced internal size of the first member and the external enlargement of the other member.

2. A joint for flexible connections including relatively movable members, one within the other, said members having substantially opposing shoulders transversely of the longitudinal axis of the joint, and a split, annular packing disposed between said shoulders with the free ends thereof overlapping for wedging engagement with each other, said packing being expansible in the outer member to increase both its external and internal diameter under force exerted in an axial direction between said opposing shoulders.

3. A flexible joint comprising in combination; a pair of relatively movable members, one within the other; a shoulder on the inside of the outer member; an opposed shoulder on the outside of the inner member; and a split, bevel-ended gasket between said members and between said shoulders, said ends overlapping or extending past each other a distance sufficient to insure fixed contact between the gasket and the inside of the outer member when the gasket is expanded by pressure applied thereto between said shoulders and at the same time prevent binding of the inner member.

4. A flexible joint for fluid pressure lines between locomotive and tender, comprising in combination; a hollow, sleeve-like member externally shouldered to provide portions of different diameter and threaded at the smaller end for attachment to an adjacent part; a hollow body member with internal diameter sufficient to receive the larger portion of the sleeve-like member and externally threaded; said two members being capable of relative rotation and sliding movement; a split gasket with overlapping ends surrounding the smaller portion of the sleeve-like member adjacent the shoulder, and an internally flanged nut adapted to screw down over the external threads of the body member and hold the gasket in position between the flange and the shoulder, said gasket being replaceable upon backing up of the nut without the necessity of unscrewing the sleeve-like member and being expansible under the pressure of the nut to frictionally grip the inside surface of the body member and at the same time release the sleeve-like member to permit free relative movement between the two members.

In testimony whereof, we have hereunto signed our names.

FREDERICK W. MARTIN.
MONTAGUE H. ROBERTS.